Fig. 1

INVENTORS
ANTHONY J. HORNFECK
HAROLD H. KOPPEL
JOHN R. LOUIS
BY
ATTORNEY

INVENTORS
ANTHONY J. HORNFECK
HAROLD H. KOPPEL
JOHN R. LOUIS
BY
ATTORNEY

INVENTORS
ANTHONY J. HORNFECK
HAROLD H. KOPPEL
JOHN R. LOUIS
BY
ATTORNEY

United States Patent Office 3,479,492
Patented Nov. 18, 1969

3,479,492
CONTROL SYSTEM
Anthony J. Hornfeck, South Euclid, and Harold H. Koppel and John R. Louis, Cleveland, Ohio, assignors to Bailey Meter Company, a corporation of Delaware
Original application Apr. 8, 1959, Ser. No. 805,019. Divided and this application June 6, 1963, Ser. No. 286,896
Int. Cl. G06g 7/48
U.S. Cl. 235—151.1
9 Claims This invention relates to process control systems and more particularly to a control system of the electronic type, and is a division of our original application Ser. No. 805,019, filed Apr. 8, 1959, now abandoned.

Presently available electric control systems are either the A-C or D-C type, the D-C system being preferable because it is less affected by A-C interference and can be applied directly to data handling equipment.

Most processes require control systems provided with various control actions such as proportional, reset, rate and various combinations thereof to maintain accurate control. In the pneumatic control system still widely used in the control field, these control actions are obtained through the use of pneumatic relays such as described in Panich Patent 2,805,678.

Electrical equivalents of such pneumatic relays have been produced which employ an electrical amplifier in combination with impedance elements which can be adjusted to produce the various control actions in a similar manner. Provision is made to disconnect the circuit elements providing the various control actions to thereby select the desired control action for a particular application.

The general arrangement in both the pneumatic and electrical relays described above is to provide a single controller chassis containing an amplifier and provided with means for obtaining all the different control actions. While such relays have performed satisfactorily, they are subject to several limitations the most important of which is the lack of flexibility and the appreciable cost. For example, since each relay chassis is capable of furnishing only the various standard control actions it is necessary to purchase specially made equipment for special process applications requiring a different control action. On the other hand, in some process applications only a single control action such as proportional action is required, but it is necessary to purchase the standard relay equipped with or with provision for the standard control actions of proportional, reset and rate even though the additional control actions will be disconnected or not used in the system. Thus, the flexibility of the above described equipment is limited and the cost is high in some instances.

Perhaps the most serious limitations of presently available electronic control equipment is the lack of an economical system design. For example in the usual system components such as control relays, selector stations and converters are provided with their own individual power supplies and chassis mounted as a unit separate from other components. No systematic arrangement of the system is employed other than having the various indicating gages and recording charts, and selector stations at one single location. As a result, servicing of the equipment is difficult, and many hours are spent in locating or isolating a cause of failure. In addition to the servicing problem use of the equipment is further limited by the fact that modification thereof is extremely difficult to accommodate process control improvements and more modern concepts. Thus, in many instances it is necessary to replace the entire control system if the process is improved or modified.

We have found that the above disadvantages of existing electronic control equipment can be eliminated by utilizing a system built up of modular plug-in components arranged in logical groups. For example all of the control action units, power supply units etc. may be mounted on one or more shelves of a cabinet or cabinets. The various indicating gages, recorders and selector stations may be mounted at another location on a control panel or console.

An advantage of this arrangement is that various control actions can be added or eliminated from the control system at minimum cost. Thus, if a control system is purchased having only proportional action and it is desired at a later date to provide reset and rate actions, it is only necessary to purchase a reset plug-in control action unit and a rate plug-in control action unit for insertion in the same cabinet with only a slight modification of the electrical wiring. This result is achieved through the use of a basic control action circuit comprising a D-C operational amplifier having passive input and feedback impedance elements to produce one or more desired control actions. Each plug-in unit consists of such a circuit. While each control action unit may be provided with only a single control action, we have also found that all the standard control actions may be provided by one plug-in unit if desired, while the more uncommon actions such as lag and lead may be provided by additional plug-in units.

A fourth advantage of this arrangement is that it removes from the control panel or console all equipment other than that required by the operator. Thus the size of the control panel may be reduced. Further by placing the control action units, power supplies etc. in separate cabinets, the environment of these components may be completely controlled and interference with or by other equipment avoided.

To provide for manual or automatic operation of the control system we have provided a new and improved selector station which is effective to block out the reset action of the control relay in the manual operation of the system and thereby provide substantially bumpless transfer from manual to automatic operation or vice versa. In addition, the selector station is provided with a single indicating gage and a novel switching arrangement for indicating the values of three different conditions in the system to aid in the transfer from one mode of operation to the other.

It is a principal object of this invention to provide an electronic control system of increased flexibility, accuracy and reliability than existing systems.

Another object of the invention is to provide an electric control relay having a plurality of control action units which are of plug-in modulator design so that control actions can be readily added or removed from the control system.

Still another object of the invention is to provide an improved electronic selector station for an electric control system.

An additional object of the invention is to increase the flexibility and faciliate servicing of an electronic control system by arranging the components in a systematic modular concept in the layout of the system.

Other objects and advantages will become apparent from the following description taken in connection with the accompanying drawings wherein.

Figure 1:
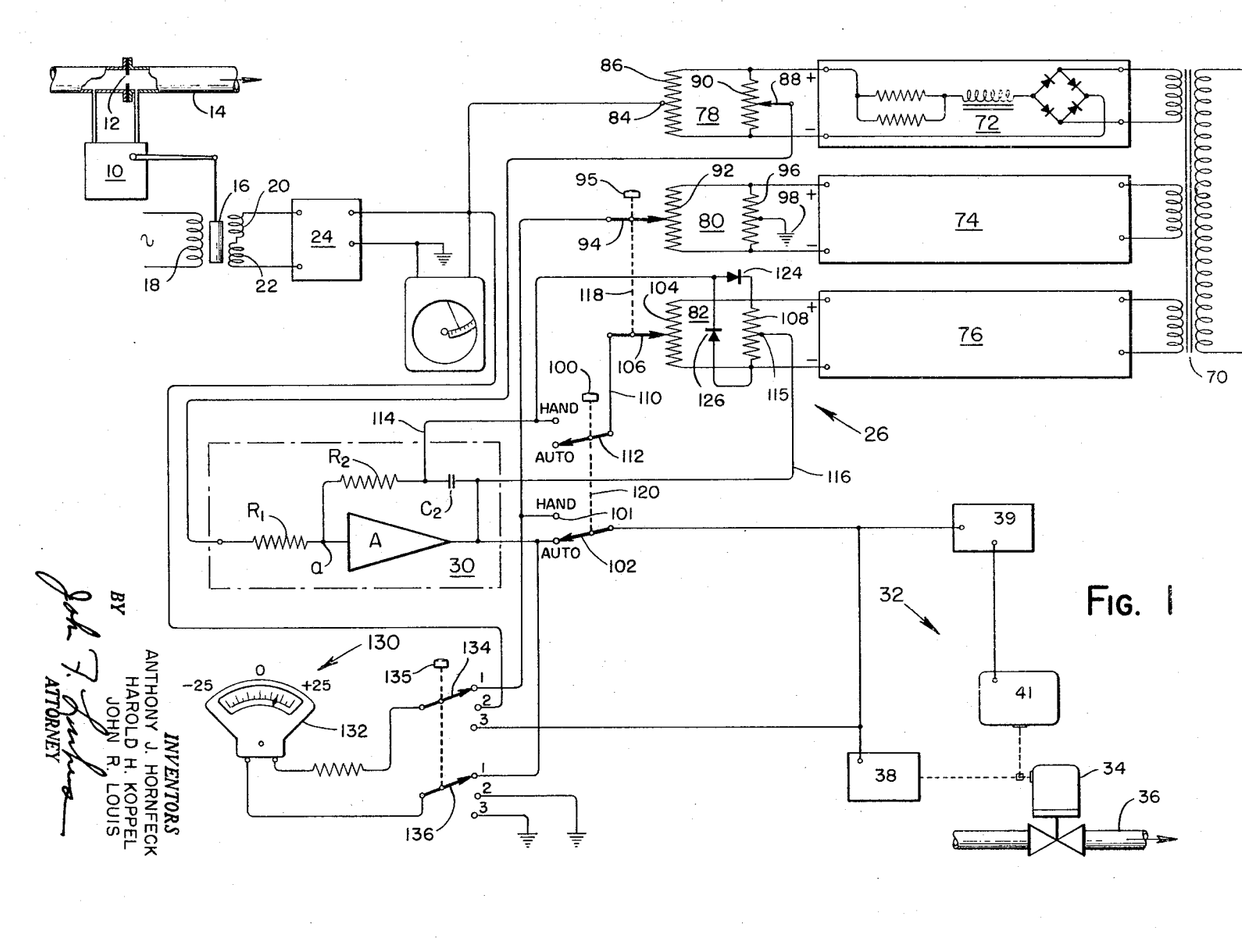
FIG. 1 is a schematic illustration of a simple process control system incorporating the features of the invention.

Referring more particularly to FIG. 1 of the drawings, there is shown a schematic illustration of a typical single element process control system. An electric transmitting device 10 is responsive to the differential pressure across a primary measuring element 12 representative of the flow rate in a conduit 14. The device 10 is effective to actuate the movable core 16 of a movable core transformer having a primary winding 18 and a pair of serially connected, oppositely wound secondary windings 20 and 22. The primary winding 18 is connected across a suitable source of alternating voltage as indicated schematically while the secondary windings 20 and 22 are coupled to a demodulator 24. With this arrangement a modulated signal is supplied to the input of the demodulator 24 with a carrier frequency corresponding to the frequency of the A-C source, the modulated amplitude of the signal being proportional to the flow rate through conduit 14. Transmitting and demodulating devices of this nature are well known to those skilled in the art, and therefore, further description is deemed unnecessary.

The demodulator 24 is effective to remove the A-C carrier signal to establish a variable D-C signal at its output terminals proportional to the flow rate in conduit 14. Through proper calibration any desired range and level of a D-C voltage signal may be produced at the output terminals of the demodulator 24. Preferably, however, the transmitting device 10 and demodulator 24 are arranged and calibrated to produce a voltage at the output terminals of the demodulator 24 in the range of −25 to +25 volts over the range of flow rates encountered.

The direct voltage output signal of the converter 24 has algebraically added to it a set point voltage in a manual-automatic selector station 26, to produce an error signal which is transmitted to an operational controller or electrical control relay indicated generally by the reference numeral 30. The controller 30 comprises a D-C operational amplifier and may be provided with one or more control actions such as rate, reset, proportional, etc. As will be hereinafter described in more detail each control action unit is a plug-in unit and provision is made for plugging in a plurality of such units to provide a plurality of control actions in a multielement control system.

The output signal of the controller 30 is taken through the manual-automatic selector station 26. During automatic operation the controller output is taken directly through the selector station 26 and transmitted to a final control element such as a power operator positioning system indicated generally by the reference numeral 32. During manual operation, however, the controller output is disconnected from the positioning system 32 and the operator manually produces a D-C voltage signal in the standard range through the adjustment of a potentiometer.

The positioning system 32 is here shown as positioning a valve 34 to control the flow rate in the conduit 36, but as will be apparent to those skilled in the art other types of systems may be employed. The positioning system 32 may also take various forms and for a disclosure of a suitable construction, reference is made to copending application Ser. No. 786,820, filed Jan. 14, 1959, by Anthony J. Hornfeck et al., now Patent 3,015,768.

As disclosed in the aforesaid Hornfeck et al. application a signal, such as generated by the controller 30, or selector station 26, may be compared with a voltage signal of a feedback transmitter 38 in the standard range which is a function of the position of valve 34. The difference between the two signals is fed into a magnetic amplifier 39 the output of which is utilized to actuate a control drive 41 for positioning the valve 34.

OPERATIONAL CONTROLLER

Referring now to the specific circuitry of the controller 30, it is desired to first point out some of the various features which must be provided in such a controller to adapt it to the various applications normally encountered in the field of instrumentation. In general, a controller whether of the pneumatic or electrical type should be capable of at least performing the control functions of proportional, summing, reset and rate action. In addition, such a controller should be capable of operating as a differential relay, a totalizing relay or a reversing relay.

Figure 16:
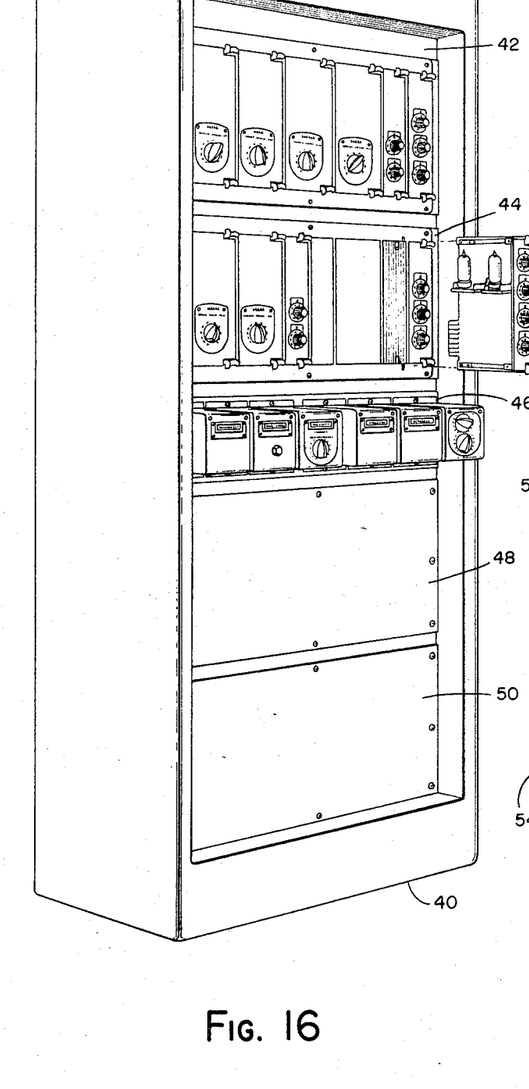
FIG. 16 is an enlarged perspective view of a cabinet illustrating a typical arrangement of control action and power supply units therein.
Figure 17:
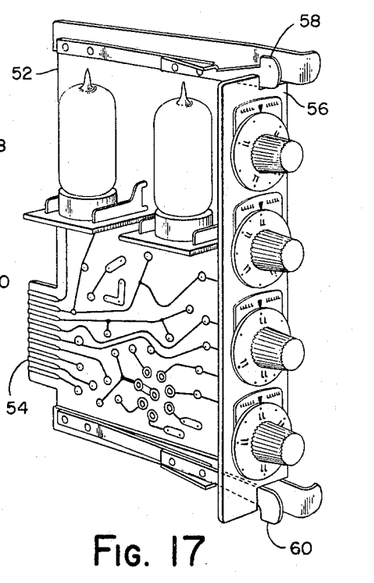
FIG. 17 is an enlarged perspective view of a typical control action unit.

Referring to FIG. 16, there is shown a component mounting cabinet 40 having a plurality of vertically spaced mounting shelves designated by reference numerals 42, 44, 46, 48 and 50. One or more of the shelves may be utilized for the mounting of a plurality of plug-in control action units the assembly of which in a particular instrumentation system forms an operational controller. The cabinet 40 may also be utilized to house the various power supplies required by the control system. In general each plug-in control action unit as shown more clearly in FIG. 17 comprises a suitable mounting plate 52 on which the various circuit elements of the unit are mounted. A projecting contact or terminal strip 54 is provided on the end of the plate and is adapted to be received by a complimental part (not shown) within the interior of the cabinet 40 to effect operative connection of the unit in the circuit of the instrumentation system when it is plugged into the shelf of the cabinet. Each unit is provided with a front face wall 56 on which the controls for manually adjusted circuit elements may be mounted. Manually operated latches 58 and 60 are mounted on the upper and lower ends of each unit respectively for latching the units in operative position within the shelves of the cabinet.

Figure 2:
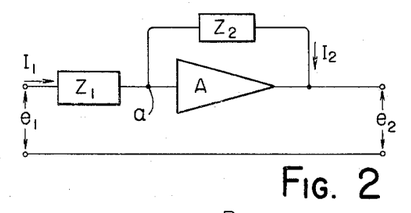
FIGS. 2–12 inclusive are schematic illustrations of the circuitry employed in the various control action units of the control relay.

Referring now to the specific circuitry of the operational controller and the various possible plug-in control action units reference is made to FIGS. 2 through 12 which disclose various plug-in control action circuits. FIG. 2 illustrates the basic circuit employed in any control action unit, and it is believed that a description of the operation and characteristics of this basic circuit will facilitate an understanding of the specific control action units.

As illustrated in FIG. 2 the various possible control action units all utilize an amplifier A which is preferably of the high gain, low output impedance type of D-C amplifier such as the type disclosed in copending application Ser. No. 770,710, filed on Oct. 30, 1958, by Harold H. Koppel et al., now Patent 3,080,531.

The various control actions are obtained by combining various passive impedance elements with this high gain, low output impedance amplifier as indicated schematically in FIG. 2. An input impedance $Z_1$ is connected in series with the amplifier A on the input side thereof, while a feedback impedance $Z_2$ is connected in a negative feedback circuit external of the amplifier A. As will later be described the impedances $Z_1$ and $Z_2$ are formed by resistors and/or capacitors to produce the various control actions.

In general, the operation of the circuit illustrated in FIG. 2 is analogous to that of the well known selfbalancing potentiometer circuit. An input voltage signal $e_1$ applied to the input terminals of the circuit will produce a current $I_1$ through the impedance $Z_1$ as indicated by the arrow. The amplifier will respond to this input signal to produce an output signal $e_2$ of opposite polarity. This output signal is effective to produce a current $I_2$ in the feedback circuit through impedance $Z_2$ which is equal to the current $I_1$. Thus, the effect is similar to the rebalancing effect in a potentiometer circuit, the amplifier being responsive to a change in the input signal $e_1$ to produce an output signal of magnitude sufficient to produce a potential at the terminal $a$ of zero magnitude.

From the above it is apparent that the output potential $e_2$ depends upon the feedback current $I_2$ required to maintain the voltage at terminal $a$ zero. This system differs from the analogous potentiometer measuring system by the fact that the balancing action of the circuit is instantaneous as compared to the time delay of several seconds required for a conventional potentiometer system to balance. For this reason, the potential at terminal $a$ is in effect always zero and may be assumed at zero potential for purposes of further analysis.

Since the potential at terminal $a$ is always nearly zero and thus equal to ground potential, the voltage drop across the impedance $Z_1$ is equal to the input voltage $e_1$. Applying Ohm's law to the input circuit the current $I_1$ may be expressed as follows:

$$I_1 = \frac{e_1}{Z_1} \qquad (1)$$

Similarly, a voltage drop equal to the output potential $e_2$ is produced across the feedback circuit between the output terminal and terminal $a$. Applying Ohm's law to this condition, the feedback current $I_2$ may be expressed as follows:

$$I_2 = -\frac{e_2}{Z_2} \qquad (2)$$

The above generalizations are included to illustrate the basic conditions in a closed loop amplifier circuit having negative feedback. It will be apparent that the gain G in the circuit may be expressed generally as the ratio of the output signal to the input signal or in this case, as the ratio of the output potential $e_2$ to the input potential $e_1$ as shown by the following equation:

$$G = \frac{e_2}{e_1} \qquad (3)$$

However, as illustrated above, the input and output signals may be expressed in terms of currents and impedances. Accordingly, substituting in the last equation for $e_1$ and $e_2$ the gain may be expressed as follows:

$$G = -\frac{I_2 Z_2}{I_1 Z_1} \qquad (4)$$

but since the input current $I_1$ is always equal to the feedback current $I_2$, the term $I_2/I_1$ is unity and the gain G may be expressed simply in terms of the input and output impedances as follows:

$$G = -\frac{Z_2}{Z_1} \qquad (5)$$

The basic analysis and equations noted above are accurate when the gain of the amplifier is high and its output impedance is low. With these conditions the analysis above although approximate, is accurate. Since the control action units illustrated in FIGS. 2–12 all utilize such a high gain low impedance amplifier, the approximate analysis is deemed sufficient.

Figure 3:
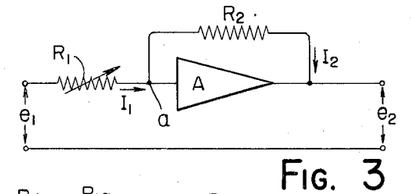

In FIG. 3 of the drawings, a specific circuit of a plug-in control action unit is illustrated which produces a proportional control action. More particularly, the impendance $Z_1$ in this case comprises a resistor $R_1$, and impedance $Z_2$ comprises a resistor $R_2$. Referring to the equation described in connection with FIG. 2, it will be apparent that the input and output potentials of the circuit illustrated in FIG. 3 may be expressed in terms of current and resistance as follows:

$$e_1 = I_1 R_1 \quad -e_2 = I_2 R_2 \qquad (6)$$

It will also be apparent that the gain G of the circuit will be equal to the ratio of the resistance value of the resistor $R_2$ to the resistance value of the resistor $R_1$ as expressed below.

$$G = -\frac{R_2}{R_1} \qquad (7)$$

In the circuit illustrated in FIG. 3, the gain of the unit may be readily adjusted by varying the value of either resistance. In the arrangement shown $R_1$ is made adjustable for this purpose.

When the two resistors $R_1$ and $R_2$ have equal resistance values, the gain will be unity and the output potential $e_2$ will be equal to the input potential $e_1$. It will be apparent that by properly sizing the resistors $R_1$ and $R_2$ any desired gain may be obtained.

Figure 4:
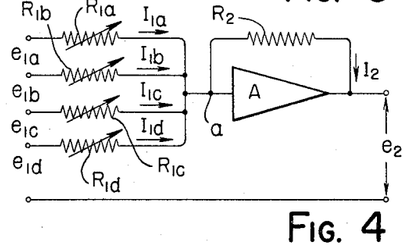

FIG. 4 illustrates a proportional control action unit for summing or averaging a plurality of input potentials $e_{1a}$, $e_{1b}$, $e_{1c}$, and $e_{1d}$. The input potentials are applied across separate resistors $R_{1a}$, $R_{1b}$, $R_{1c}$, $R_{1d}$ respectively which are equivalent in function to the resistor $R_1$ of FIG. 3.

In this case also the potential at terminal $a$ must be zero. Accordingly, the feedback current $I_2$ must equal the sum of the currents $I_{1a}$–$I_{1d}$ flowing through the resistors $R_{1a}$–$R_{1d}$. Thus, the following equation may be written:

$$I_2 = I_{1a} + I_{1b} + I_{1c} + I_{1d} \qquad (8)$$

Since the potential at terminal $a$ is virtually zero the voltage drop across each resistor is equal to the input potential applied thereto. Thus, applying Ohm's law the currents $I_{1a}$–$I_{1d}$ may be expressed in terms of resistance and voltage as follows:

$$I_{1a} = \frac{e_{1a}}{R_{1a}} \quad I_{1b} = \frac{e_{1b}}{R_{1b}} \quad I_{1c} = \frac{e_{1c}}{R_{1c}} \quad I_{1d} = \frac{e_{1d}}{R_{1d}} \qquad (9)$$

In addition as hereinbefore described, the feedback current $I_2$ may be expressed as follows:

$$I_2 = -\frac{e_2}{R_2} \qquad (10)$$

Substituting the expressions for current in terms of voltage and resistance, Equation 8 produces the following equation in terms of voltage and resistance:

$$-\frac{e_2}{R_2} = \frac{e_{1a}}{R_{1a}} + \frac{e_{1b}}{R_{1b}} + \frac{e_{1c}}{R_{1c}} + \frac{e_{1d}}{R_{1d}} \qquad (11)$$

Solving the last equation for $e_2$ the following equation results:

$$-e_2 = \frac{e_{1a} R_2}{R_{1a}} + \frac{e_{1b} R_2}{R_{1b}} + \frac{e_{1c} R_2}{R_{1c}} + \frac{e_{1d} R_2}{R_{1d}} \qquad (12)$$

Obviously if the input resistors are equal in value to the feedback resistor $R_2$ the last equation reduces to:

$$-e_2 = e_{1a} + e_{1b} + e_{1c} + e_{1d} \qquad (13)$$

It is apparent that the relative effects of the signals may be varied by selectively adjusting the resistance values of $R_{1a}$–$R_{1d}$.

Averaging operation can also be obtained with the circuit illustrated in FIG. 4 by properly sizing the feedback resistor $R_2$ in relation to resistors $R_{1a}$–$R_{1d}$. More particularly with the circuit illustrated in FIG. 4 having four inputs, averaging is achieved by using input resistors $R_{1a}$–$R_{1d}$ of equal value and employing a feedback resistor $R_2$ of one fourth this value. This averaging effect will be apparent from the following substitution of values in the original equation in terms of voltage and resistance:

$$-e_2 = \frac{e_{1a}R_2}{R_{1a}} + \frac{e_{1b}R_2}{R_{1b}} + \frac{e_{1c}R_2}{R_{1c}} + \frac{e_{1d}R_2}{R_{1d}} \quad (14)$$

$$-e_2 = e_{1a}\left(\frac{1}{4}\right) + e_{1b}\left(\frac{1}{4}\right) + e_{1c}\left(\frac{1}{4}\right) + e_{1d}\left(\frac{1}{4}\right) \quad (15)$$

$$-e_2 = \frac{e_{1a} + e_{1b} + e_{1c} + e_{1d}}{4} \quad (16)$$

Thus an output potential $e_2$ is produced equal to the sum of the input potentials divided by the number of input signals to produce an averaging effect.

The circuit illustrated in FIG. 4 can also be employed to substract one variable from another by reversing the polarity of one input whereby the output potential $e_2$ will be equal to the difference or algebraic sum of the inputs. The analysis of such a circuit is identical to that for the basic totalizing action except that a negative sign would be applied to the one input voltage. Since there is a reversal in polarity across the basic D-C amplifier circuit employed, an additional amplifier may be used in combination with the totalizing unit to produce the desired reversal in polarity of one of the inputs. Thus, by combining a proportional control action unit as illustrated in FIG. 3 having unity gain with a totalizing unit as illustrated in FIG. 4 having two inputs, a differential control action can be achieved.

Figure 5:
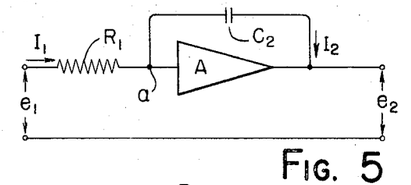

FIGURE 5 of the drawings illustrate the particular impedances employed in the basic circuit of FIG. 2 to achieve integrating control action wherein the output signal $e_2$ is proportional to the integral of the input signal $e_1$. In the circuit of FIG. 5, the input impedance $Z_1$ comprises a resistance $R_1$, but the feedback impedance $Z_2$ in this case comprises a capacitor designated as $C_2$. Considering first the function of the capacitor $C_2$ it is necessary to analyze the following basic equation for the current flow through a capacitor:

$$I = C \frac{de}{dt} \quad (17)$$

In this equation C is the value of the capacitance in farads; $de/dt$ is the derivative or rate of change of the voltage applied across the capacitor with respect to time, and I is the current flow through the capacitor. From this equation it is apparent that the current flow through a capacitor is proportional to the rate of change of the applied voltage with respect to time. It is also apparent that to produce a constant current flow through a capacitor, the voltage must change at a constant rate.

Applying this basic equation for current flow through a capacitor to the circuit illustrated in FIG. 5, the feedback current $I_2$ is obviously proportional to the rate of change of the output signal $e_2$ with respect to time as shown by the following equation:

$$I_2 = -C_2 \frac{de_2}{dt} \quad (18)$$

Thus to produce a constant current in the feedback circuit it is necessary for the output voltage to constantly change with respect to time.

It was previously shown that the input current $I_1$ must equal the feedback current $I_2$. Thus, the following substitutions can be made:

$$I_1 = \frac{e_1}{R_1} = -C_2 \frac{de_2}{dt} \quad (19)$$

Solving the last equation for $e_2$ produces the following equation:

$$-\int de_2 = \frac{1}{R_1 C_2} \int e_1 dt \quad (20)$$

which reduces to:

$$-e_2 = \frac{1}{R_1 C_2} \int e_1 dt \quad (21)$$

From the last equation it is apparent that the output signal $e_2$ is proportional to the integral of the input signal $e_1$, the time constant of integration being $R_1 C_2$.

Assume now that $e_1$ is a control signal representative of the magnitude of a process and constant at a predetermined value. With this condition the input current $I_1$ will be constant. To maintain an equal feedback current $I_2$, however, the output voltage $e_2$ must constantly change at a predetermined rate except where $e_1$ is zero.

Figure 6:
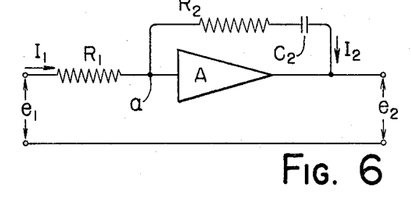

FIGURE 6 illustrates a modification of the circuit illustrated in FIG. 5 to obtain proportional action in addition to the pure reset action provided by the circuit of FIG. 5. The circuit of FIG. 6 differs from that shown in FIG. 5 by the addition of resistor $R_2$ in the feedback circuit in series with the capacitor $C_2$.

In this case the output potential $e_2$ is equal to the original expression in terms of the integral of the input potential $e_1$ noted in connection with FIG. 5 plus the voltage drop across the resistor $R_2$ as shown below:

$$-e_2 = I_2 R_2 + \frac{1}{R_1 C_2} \int e_1 dt \quad (22)$$

However, $I_2$ must still equal $I_1$. Therefore, the above equation through substitution of the voltage resistance value of $I_1$ becomes:

$$-e_2 = \frac{e_1 R_2}{R_1} + \frac{1}{R_1 C_2} \int e_1 dt \quad (23)$$

$$-e_2 = \frac{R_2}{R_1}\left[e_1 + \frac{1}{R_2 C_2} \int e_1 dt\right] \quad (24)$$

If both $R_2$ and $R_1$ are equal the gain of the proportional action will be unity and the last equation will reduce to the following:

$$-e_2 = e_1 + \frac{1}{R_2 C_2} \int e_1 dt \quad (25)$$

It will be noted from the last equation that for a change in the input signal $e_1$ an immediate equal proportional output is obtained which in this case is equal to the input signal. In addition a continuous change in output signal proportional to the integral of the input signal is produced, the resulting output signal being equal to the algebraic sum of the integrating and proportional output signals.

It is possible with the unit illustrated in FIG. 6 to vary the reset rate as well as the gain of the proportional action by selectively varying the value of the resistors $R_2$ and $R_1$. This will be apparent upon examination of the basic equation 24. From this equation it is apparent that if $R_2$ and $R_1$ are varied simultaneously the ratio $R_2/R_1$ and thus the gain will remain constant. However, since the value of $R_2$ affects the value of the time constant $R_2 C_2$ the reset rate will vary. Acordingly, adjustment of $R_1$ and $R_2$ simultaneously is effective to vary the reset rate without affecting the proportional action.

A different problem exists, however, when it is desired to vary the gain and maintain the reset rate constant. Since the reset rate is defined as the number of times per minute that the reset action repeats the proportional action, and since the reset action is expressed in terms of the integral of $e_1$ in the above equation, it is necessary to modify both the proportional action term and reset action term in the above equation equally to vary the gain without affecting the reset rate as defined. This can be accomplished by independent adjustment of the value of $R_1$ to vary the value of the factor $R_2/R_1$ which affects both the proportional action and reset action terms equally.

While the reset rate and proportional action of the circuit of FIG. 6 can be adjusted in the described manner, the method is not practical due to the difficulty of arranging the resistors $R_2$ and $R_1$ so that both can be varied simultaneously but yet one independently.

Figure 7:
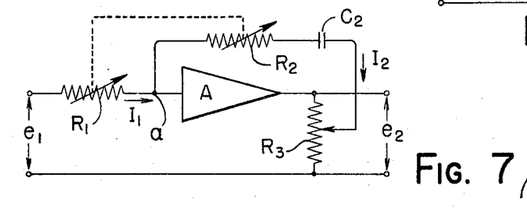

The circuit of FIG. 7 differs from that of FIG. 6 in that a slidewire resistance $R_3$ is connected across the output of the amplifier and provided with an adjustable contact arm to which the feedback circuit is connected. It is apparent that the output potential of the circuit disclosed in FIG. 7 is applied across the slidewire resistance $R_3$ and that the potential of its contact arm is determined by its position relative to the slidewire. In effect, the slidewire $R_3$ and contact arm form a voltage dividing network for controlling the potential applied to the feedback circuit. Thus, in this case the voltage drop across the feedback circuit is not equal to the output potential $e_2$ but instead is equal to the potential of the contact arm which may be equal to or less than the output potential $e_2$ depending on the position thereof.

In the analysis of the circuit illustrated in FIG. 6 equation 24 was developed for the output potential $e_2$ in terms of the input potential $e_1$. This equation was derived by considering the voltage drop across the feedback circuit as equal to the output potential $e_2$. However, in the case of the circuit illustrated in FIG. 7 the voltage drop across the feedback circuit is equal to some percentage of $e_2$ depending on the position of the contact arm. Thus, Equation 24 may be modified as follows for the circuit of FIG. 7.

$$-Ke_2 = \frac{R_2}{R_1}\left[e_1 + \frac{1}{R_2C_2}\int e_1 dt\right] \qquad (26)$$

In the last equation $e_2$ is multiplied by a constant K which represents the percentage of the output potential $e_2$ applied to the feedback circuit, this constant being determined by the position of the contact arm of resistance $R_3$. If this last equation is solved for $e_2$, the following equation results:

$$-e_2 = \frac{1}{K}\frac{R_2}{R_1}\left[e_1 + \frac{1}{R_2C_2}\int e_1 dt\right] \qquad (27)$$

It is to be noted that in the last equation the constant K affects both the proportional action and the reset action in the same manner as the term $R_2/R_1$. Thus, if the feedback voltage is varied through adjustment of the position of the contact arm the proportional action will be varied but the reset rate will remain constant. The reset rate of the circuit in FIG. 7 is adjusted in the same manner as described for the circuit of FIG. 6; namely, by varying the values of resistors $R_2$ and $R_1$ simultaneously as shown schematically.

Figure 8:
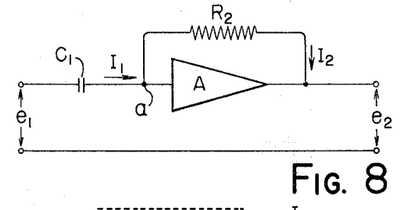

Rate or derivative action is obtained with the circuit illustrated in FIG. 8. In this case the input impedance $Z_1$ comprises capacitor $C_1$ and the feedback impedance $Z_2$ comprises resistor $R_2$. The input current can be expressed by the basic formula for current flow through a capacitor:

$$I_1 = C_1 \frac{de_1}{dt} \qquad (28)$$

Thus, similar to the feedback circuit in the case of reset action, the current flow $I_1$ is proportional to the rate of change of the input voltage $e_1$. Since the feedback circuit contains only resistor $R_2$ and $I_2$ must equal $I_1$ the following equation can be developed:

$$-e_2 = R_2C_1\frac{de_1}{dt} \qquad (29)$$

The last equation illustrates that the output voltage is proportional to the derivative of the input voltage with a constant of $R_2C_1$. Thus, the output potential $e_2$ is equal to or proportional to the rate of change of the input potential $e_1$.

Figure 9:
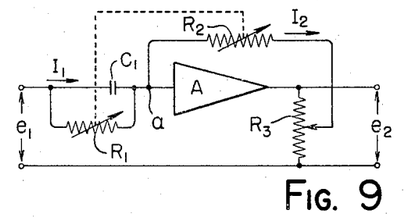

The circuit of FIG. 9 produces both proportional and derivative control actions. This circuit differs from the preceding unit illustrated in FIG. 8 by the addition of a resistor $R_1$ connected in parallel with the capacitor $C_1$. The input current $I_1$ in this case will be the sum of the currents through the capacitor $C_1$ and resistor $R_1$:

$$I_1 = C_1\frac{de_1}{dt} + \frac{e_1}{R_1} \qquad (30)$$

Since $I_1$ must equal $I_2$:

$$-e_2 = \frac{R_2}{R_1}\left[e_1 + R_1C_1\frac{de_1}{d_1}\right] \qquad (31)$$

If $R_1$ and $R_2$ are equal, the last equation can be reduced to the following:

$$-e_2 = e_1 + R_1C_1\frac{de_1}{dt} \qquad (32)$$

It is to be noted that in the circuit of FIG. 9 the feedback potential also depends upon the position of the contact arm with respect to the slidewire $R_3$. Accordingly, the feedback voltage must be expressed as $Ke_2$ as in the case of the circuit disclosed in FIG. 7 as shown by the following equation:

$$-e_2 = \frac{1}{K}\frac{R_2}{R_1}\left[e_1 + R_1C_1\frac{de_1}{dt}\right] \qquad (33)$$

The proportional and rate action of the circuit disclosed in FIG. 9 are adjusted in a manner similar to the proportional and reset actions of the circuit of FIG. 7. More particularly, simultaneous adjustment of the value of resistors $R_1$ and $R_2$ varies the time constant while adjustment of the contact arm of resistance $R_3$ varies the constant K to thus vary the proportional action while maintaining a constant rate action.

Figure 10:
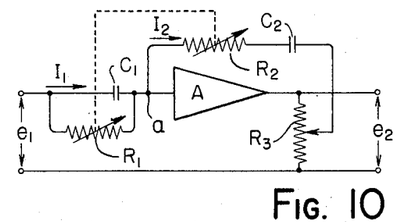

FIG. 10 illustrates a circuit for producing combined proportional action, rate action, and reset action with proportional action adjustability. In general, the circuit comprises a capacitor $C_1$ connected in parallel with a resistor $R_1$ in the input circuit while a capacitor $C_2$ is connected in series with resistor $R_2$ in the feedback circuit, the slidewire resistance $R_3$ and contact arm being effective to vary the feedback current and gain as hereinbefore described.

It will be apparent from the previous analysis of the circuit illustrated in FIGS. 6 and 9 that the following equation results:

$$-e_2 = \frac{1}{K}\frac{C_1}{C_2}\left[e_1\frac{R_2C_2}{R_1C_1} + R_2C_2\frac{de_1}{dt} + \frac{1}{R_1C_1}\int e_1 dt + e_1\right] \qquad (34)$$

The rate time in this last equation is $R_2C_2$ while the reset rate is $R_1C_1$. Accordingly, the reset rate may be readily varied by adjusting the value of resistor $R_1$ while the rate time may be adjusted by varying the value of resistor $R_2$. Adjustment of the contact arm on the other hand will vary the feedback voltage as previously described.

Figure 11:
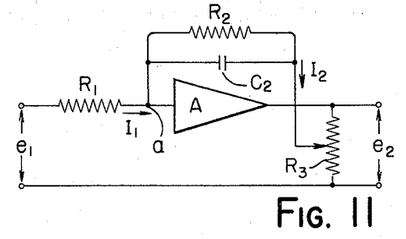

FIG. 11 illustrates a circuit for producing a delayed proportional control action. As illustrated in FIG. 11, this circuit comprises a resistor $R_1$ forming the input impedance and a resistor $R_2$ connected in parallel with a capacitor $C_2$ in the feedback circuit to establish the feedback impedance. The feedback voltage and the gain of the circuit is controlled by the slidewire resistance $R_3$. It can be shown mathematically that the following relationship between the input potential and output potential exists when $R_2$ equals $R_1$:

$$-e_2 = \frac{1}{K}e_1\left(1 - \epsilon^{\frac{-t}{R_2C_2}}\right) \qquad (35)$$

This equation shows that the output potential $e_2$ will vary along an exponential curve in response to a change in the input potential $e_1$ to introduce a lagging action.

To explain the operation of the circuit illustrated in FIG. 11 in more general terms, the effect of the capacitor $C_2$ in the feedback circuit is to delay or effect a lag in the build-up of the output potential $e_2$ in response to a step change in the input potential $e_1$, the charging rate of the capacitor $C_2$ being dependent on the value of the resistor $R_2$.

Figure 12:
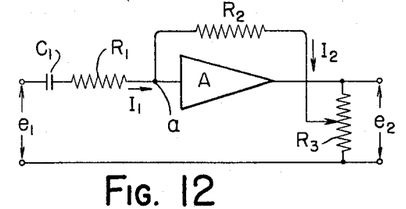

FIG. 12 of the drawing illustrates a circuit for obtaining an action analogous to the lag action described in connection with FIG. 11 but opposite in effect to produce an output potential in response to a change in the input potential varying along an exponential curve with a leading action. The circuit in this case comprises a capacitor $C_1$ connected in series with a resistor $R_1$ in the input circuit and a resistor $R_2$ connected in the feedback circuit, the gain being adjustable as before through the provision of slidewire resistance $R_3$. The following exponential equation gives the relationship between $e_1$ and $e_2$:

$$-e_2 = \frac{1}{K} e_1 \left( \epsilon^{\frac{-t}{R_1 C_1}} \right) \tag{36}$$

This equation indicates that when $R_1$ equals $R_2$ the output potential $e_2$ varies along an exponential curve in response to a change in the input potential $e_1$. However, in this case as distinguished from the lag action a maximum potential is produced instantaneously upon a step change in the input potential and decreases along an exponential curve to a level corresponding to the proportional gain of the circuit. Thus, the effect of the capacitor $C_1$ and $R_1$ in this case is to produce an instantaneous high output potential which decreases with time as determined by the charging rate of the capacitor until the proportional output for the gain of the circuit is reached.

The single element process control system illustrated in FIG. 1 is provided with an operational controller 30 comprising a single plug-in control action unit of the proportional plus reset type as illustrated in FIG. 6. As will be apparent to those skilled in the art, however, and as will be described in reference to FIGS. 13 and 14, in more complicated process instrumentation several of the plug-in control action units may be utilized to achieve proper control.

SELECTOR STATION

The selector station 26 as illustrated in FIG. 1 in general comprises a plurality of power supplies and potentiometer circuits which provide for adjustment of the control set point, manual control of the valve 34, a variable voltage tieback to block the reset action of the controller 30 during manual operation, and a voltage limiting action which limits the reset action during automatic operation.

Considering first the general circuitry involved, the primary winding of a transformer 70 is connected to a suitable source of alternating voltage to energize 3 secondary windings which in turn energizes 3 D-C power supply circuits 72, 74, and 76, respectively. Each of the power supplies is formed from conventional circuitry including a bridge type rectifier to produce a D-C output voltage at the power supply output terminals as indicated schematically on the drawing. The power supplies 72, 74 and 76 energize three D-C potentiometer circuits 78, 80 and 82 respectively which are manually adjustable to determine the set point, manual control, and variable tieback voltages.

The power supply 72 and potentiometer circuit 78 form the set point circuit for the control system. More particularly, the output of the demodulator 24 is connected to a center tap 84 of a resistor 86 forming a portion of the potentiometer circuit 78. The input of the controller 30 is connected to an adjustable contact arm 88 of a slide wire resistance 90 of the potentiometer circuit 78. With this arrangement a voltage is added to or subtracted from the output voltage of demodulator 24 depending on the position of the contact arm 88. Thus, the value of the variable required to produce zero voltage at junction $a$ is shifted accordingly. By adjustment of the contact arm 88 the system set point is easily varied to thus vary the controlled magnitude of the variable.

The power supply 74 and potentiometer circuit 80 provide a means for manually controlling the position of the control valve 34 and are generally similar in circuitry so that of the power supply 72 and potentiometer circuit 78. In this case, the potentiometer circuit 80 is formed by a slidewire resistance 92 having a movable contact arm 94 and a resistance 96 having a center tap grounded at 98.

The contact arm 94 is connected to a fixed contact 101 of a double pole double throw switch 100 having movable switch arms 102 and 112. For the purpose of clarity the positions of the switch arm 102 are designated "Hand" and "Auto." In the "Hand" position the switch arm 102 serves to connect the movable contact arm 94 directly to the power operator positioning system, and the controller 30 is ineffective in the control system. Thus, the signal applied to the positioning system will be the voltage of the contact arm 94. The position of contact arm 94 may be manually adjusted by a knob 95 to thus manually control the position of the valve 34. When the contact arm 102 is in the "Auto" position the output of the controller 30 is applied directly to the positioning system to thereby effect automatic positioning of the valve 34.

The power supply 76 and potentiometer circuit 82 provides a means for "blocking" the action of the reset capacitor $C_2$ during manual operation of the control system and for limiting the voltage drop across the capacitor $C_2$ during automatic operation. During "Auto" or "Hand" operation of the system the output signal $e_2$ of the controller 30 will be proportional to the signal $e_1$ plus the voltage corresponding to the integral of this signal as previously described. Due to this integrating action it is possible for the controller to integrate to saturation of its amplifier and for the output voltage $e_2$ to become extremely high during periods of sustained deviations in the variable from set point. These conditions are undesirable for the reason that it is difficult to transfer from "Hand" to "Auto" operation; and because a substantial lag is produced in the response of the system in some instances during automatic operation.

For example, if the standard signal range of the system is $-25$ to $+25$ volts then the valve 34 will be opened completely at one end of this range and closed completely at the other end of the range. Now if during automatic operation there is a sustained deviation of the variable, the integrating action may produce an output of controller 30 as high as $+$ or $-70$ volts. When this condition occurs it is obviously necessary for the output of the controller 30 to decrease from 70 volts to 25 volts before any positioning of the valve 34 can occur in the opposite direction. During "Hand" operation of the system the valve 34 is positioned independently of the controller 30 output and, therefore, integration of the controller 30 to saturation will occur even upon slight sustained deviations in the variable from the control point rendering it difficult to effect transfer to "Auto" operation.

Referring first to the circuitry for blocking the reset action of capacitor $C_2$ during "Hand" operation, the potentiometer circuit 82 includes a slidewire resistance 104 provided with a movable contact arm 106 and a resistance 108. The movable contact arm 106 is connected by a conductor 110 to a second movable arm 112 of the switch 100. One fixed contact of the switch 112 is connected by a conductor 114 to one side of the capacitor $C_2$ whereby actuation of the arm 112 to the "Hand" position will connect the movable contact arm 106 to this side of the capacitor $C_2$. The center tap 115 of the resistor 108 is connected by a conductor 116 to the other side of the capacitor $C_2$ to thereby complete a circuit around the capacitor $C_2$. With this arrangement, when the switch arm 112 is in the "Hand" position, the output voltage of the potentiometer circuit 82 is applied across the capacitor $C_2$ thereby blocking the integrating action.

The movable contact arm 106 is connected by a linkage 118 to the movable contact arm 94 whereby simultaneous positioning of the two contact arms will occur. Through calibration, the two potentiometer circuits 80 and 82 are set to produce equal output voltages so that during manual operation the voltage blocking the integrating action of the capacitor $C_2$ is equal to the manual control voltage. Thus, the output voltage of the controller 30 will be equal to the input voltage plus the manual control voltage $e_m$ as shown by the following equation $$e_2 = e_1 + e_m \tag{37}$$

It is evident that when the control variable is at set point the input signal $e_1$ will be zero and the input signal of the controller 30 will be equal to the tieback voltage across capacitor $C_2$ or to the manual control voltage.

The provisions of the tieback circuit for capacitor $C_2$ during "Hand" operation greatly facilitates the return of the system to "Auto" operation. As previously mentioned if this tieback circuit were not provided the controller 30 wound integrate to saturation of its amplifier in one or the other direction. If this condition existed it would be virtually impossible to equalize the controller output and the manual control voltage to effect a dumpless transfer from manual to automatic operation. With the provision of the tieback circuit, however, it is only necessary to vary the set point of the control system through adjustment of contact arm 84 until the input to conroller 30 is zero whereupon the transfer can be made. Thereafter the control point may be gradually returned to the desired value through further adjustment of the contact arm 84.

Referring now to the circuitry for limiting the voltage drop across capacitor $C_2$ during automatic operation, the positive terminal of power supply 76 is connected through a diode rectifier 124 to the conductor 114 while the negative terminal is connected through a diode rectifier 126 to the same conductor. With this arrangement, when the diode 124 conducts the positive terminal of the power supply 76 will be connected to one side of the capacitor $C_2$ and when the other diode conducts the negative terminal will be similarly connected.

The polarity of the diodes 124, 126 are arranged so that the diode 124 will conduct whenever the voltage across capacitor $C_2$ is equal to the voltage between the positive terminal of power supply 76 and center tap 115. Thus, this diode will conduct to limit the voltage across capacitor $C_2$ to $+25$ volts. Similarly, the diode 126 is arranged to conduct when the voltage across capacitor $C_2$ is equal to the voltage between the negative terminal of power supply 74 and center tap 115 to thus limit the voltage across the capacitor $C_2$ to $-25$ volts.

When either of the diodes 124, 126 conduct, the integrating action of the capacitor $C_2$ will cease and the voltage across the same will be constant at $+$ or $-25$ volts depending on which diode is conductive. As was previously mentioned the output voltage of the unit 30 during automatic operation is equal to the proportional component plus the integration component which is the voltage across capacitor $C_2$. By limiting the voltage across capacitor $C_2$ to $+$ or $-25$ volts, the output voltage can accordingly be limited to substantially the same value. In effect, this eliminates integration of the capacitor $C_2$ to saturation of the amplifier and eliminates the condition previously described where voltages across the capacitor as high as 70 volts might be developed.

Since the standard signal range of the system for the particular embodiment disclosed is $-25$ to $+25$ volts, the valve 34 will be opened completely at one end of this range and closed completely at the other end. Due to the provision of the limiting circuit for the capacitor $C_2$ normal integration will occur in the controller 30 in both a negative and positive direction when the voltage across the capacitor $C_2$ is between the values of $-25$ and $+25$ volts. If this voltage, however, should increase or decrease to a higher or lower value, the appropriate diode 124 or 126 will conduct to black any further integration action and limit the voltage across capacitor $C_2$ to $+$ or $-25$ volts thereby preventing further increase in the output signal of the controller 30 when the valve 34 is in a closed or open position.

To facilitate equalization of the "Hand" control voltage (output of potentiometer circuit 80) with the output voltage of controller 30 prior to a transfer of control from "Auto" to "Hand" or vice versa, a novel indicating means 130 is provided to indicate the instantaneous difference or deviation of the "Hand" control voltage from the controller output voltage; to indicate the position of the valve 34; and to indicate the magnitude of the controlled variable. More particularly, a single indicating meter 132 is employed which has its terminals connected across the movable arms 134 and 136 of a three position selector switch 135. The switch arms are mechanically coupled for movement as a unit and are each cooperable with three fixed contacts 1, 2 and 3. When the switch arms engage contacts 1 the output of potentiometer circuit 80 or the "Hand" control voltage is connected in series opposition with the output voltage of the controller 30 across the terminals of the meter 132. Thus, the meter 132 will indicate the difference between the "Hand" control and controller 30 output voltages.

When the switch arms engage contacts 2 the output of the potentiometer circuit 78 is applied to the terminals of the meter 122 to provide for indication of the controlled variable.

When the switch arms engage contacts 3 the output of the valve position transmitter 38 is applied to the terminals of the meter to provide a visual indication of the valve position.

If it is desired to transfer the system from "Auto" to "Hand" control or vice versa, the operator need only actuate the switch 135 to produce an indication of the transfer deviation on the meter 132, and then adjust knob 95 until the transfer deviation is zero. Following this operation, the switch 100 may be actuated from the "Auto" to the "Hand" position or vice versa without causing a change in the position of valve 34.

Figure 18:
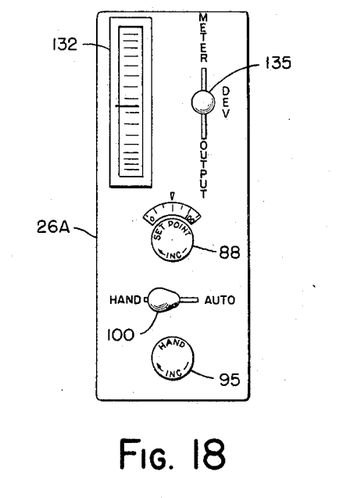
FIG. 18 is a front elevation of Selector Station shown in FIG. 1.

In FIG. 1 we have shown the selector station in diagrammatic form to assist in explaining its operation. The instrumentalities and circuitry may be arranged, however, in a compact unit arranged for panel or console mounting. Thus in FIG. 18 we show a front view of a selector station 26A such as schematically illustrated in FIG. 1 at 26 and wherein like reference numbers have been used to identify the various instrumentalities.

COMBUSTION AND FEEDWATER CONTROL SYSTEMS

Figure 13:
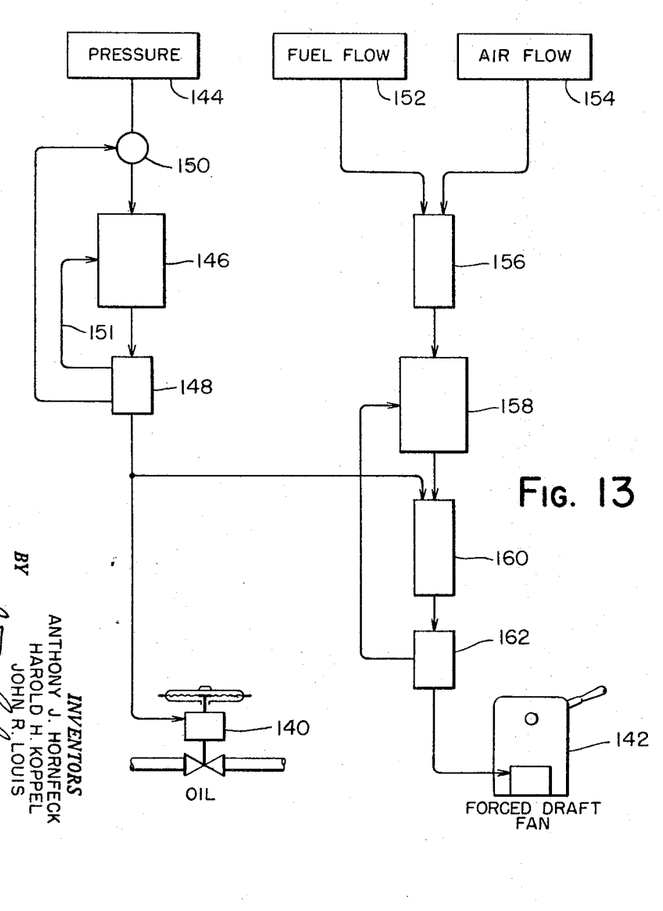
FIG. 13 is a schematic illustration of a combustion control system constructed in accordance with the teachings of the invention.
Figure 14:
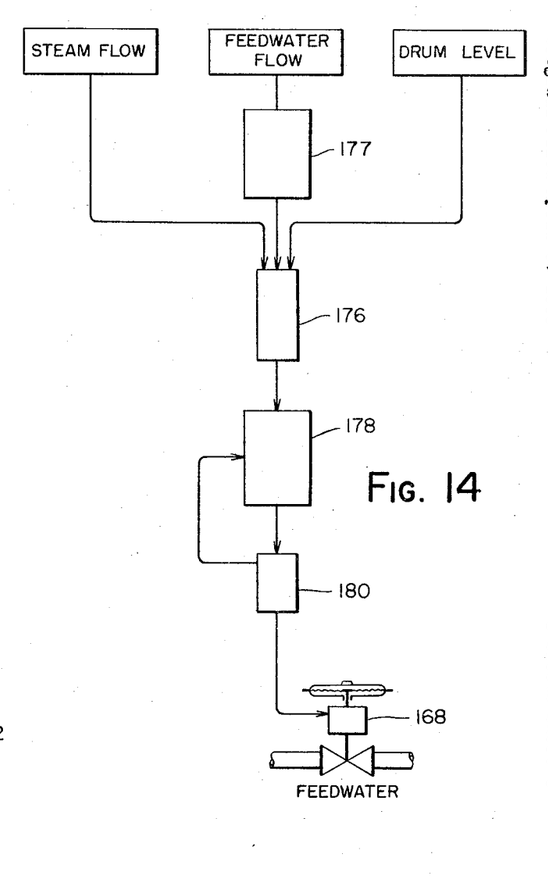
FIG. 14 is a schematic illustration of a feedwater control system constructed in accordance with the teachings of the invention.

Referring now to FIGS. 13 and 14, there is shown in FIG. 13 schematically a commercial application of the invention to a combustion control system. FIG. 14 illustrates schematically a second application of the invention to a feed water control system. The systems illustrated in FIGS. 13 and 14 are both employed in the control of a modern steam generating plant.

Referring now to FIG. 13, there is shown a fuel flow regulating valve 140 and a force draft fan 142 which may be employed to control the flow of fuel and air to the combustion chamber of a boiler (not shown). The valve 140 and fan 142 are controlled primarily in parallel from a control index of steam pressure with the control for the fan 142 being further adjusted from the control indexes of fuel flow and air flow. The control of fuel flow and air flow to a boiler from these indexes is well known to those skilled in the art.

A steam pressure transmitter 144 is responsive to the steam pressure as sensed by a suitable sensing element (not shown) to establish a direct voltage signal in the range of −25 to +25 volts which is supplied to the input of a plug-in control action unit 146 of the type illustrated in FIG. 7 having proportional plus reset action. The output signal of the control action unit 146 is taken through a manual-automatic selector station 148 identical to the selector station 26 illustrated in detail in FIG. 1 and utilized to position the valve 140.

A pair of transmitters 152 and 154 are effective to establish output signals in the range of −25 to +25 volts representative of the fuel flow and air flow respectively. In this case, however, the flow signals are algebraically added in plug-in control action unit 156 of the type disclosed in FIG. 4 of the drawings. The output is applied to a proportional plus reset unit 158 identical to the unit 146.

A second algebraic summing unit 160 of the type disclosed in FIG. 4 receives the output of the unit 158 and in addition the output of the Selector Station 148 and has its output taken through a manual automatic Selector Station 162 and utilized to position or control operation of the forced draft fan 142. The Selector Station 162 is identical in circuitry to that disclosed in FIG. 1 with the exception that the potentiometer circuit 78 for establishing the Set Point and associated power supply is omitted or not employed in the system. As indicated schematically, however, voltage tie-back and limiting action in connection with the proportional plus reset unit 158 is provided.

The feedwater control system illustrated in FIG. 14 comprises a flow regulating valve 168 which is positioned from the indices of steam flow, feedwater flow and boiler drum level. Three transmitters 170, 172 and 174 responsive to these variables are effective to establish direct voltage signals in the range of −25 to +25 volts which are supplied as inputs to an algebraic summing unit 176 of the type illustrated in FIG. 4. The feedwater flow signal is preferably introduced to the unit 176 through a lag unit 177 such as illustrated in FIG. 11 which serves to prevent cycling of the control loop. The unit 176 of the type illustrated in FIG. 4. The feedwater the algebraic sum of the three input signals, which is introduced into control action unit 178, of the type disclosed in FIG. 7, having proportional plus reset characteristics. The output of the unit 178 is taken through a manual-automatic Selector Station 180 and utilized to effect positioning of the valve 168 to control the supply of feedwater. The Selector Station 180 is similar to the Selector Station 148 providing tieback and voltage limiting operation in connection with the proportional plus reset unit 178 as well as Set Point adjustment.

Figure 15:
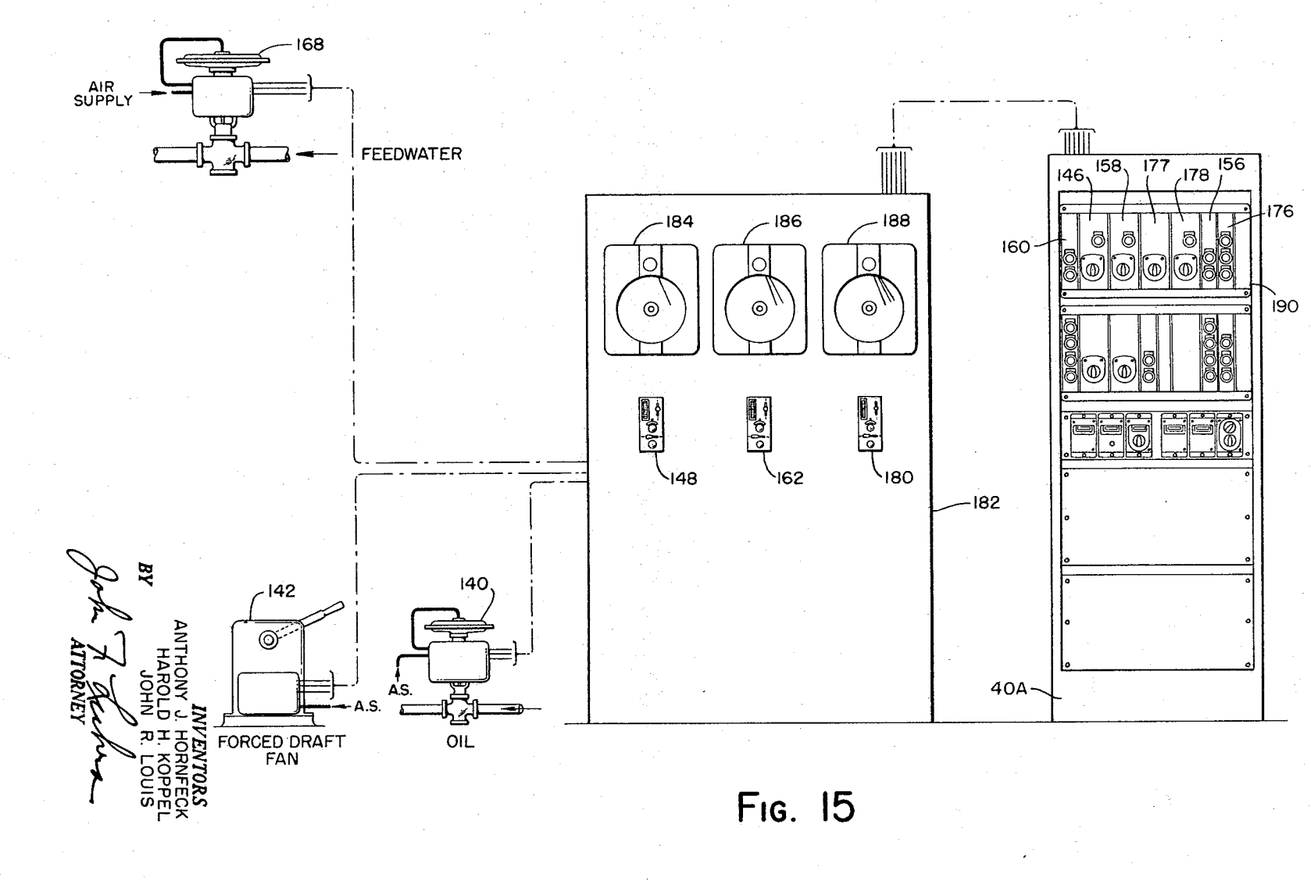
FIG. 15 is a schematic illustration of the physical mounting of the various components of the electric control systems illustrated in FIGS. 13 and 14.

Referring now to FIG. 15, the physical mounting and separation of the components illustrated and described in connection with FIGS. 13 and 14 is shown. The various control action units utilized are mounted in rows on shelves of the cabinet 40A. Each control action unit is adapted to plug into appropriate slots in the shelves so as to be readily removable for servicing or replacement. In addition, the cabinet 40A is provided with additional shelves into which plug-in control action units for other control systems can be readily mounted as shown or into which additional units can be mounted if it is desired to modify or alter the mode of control employed in the systems illustrated in FIGS. 13 and 14. Thus, the system is extremely flexible and the system is easily adapted to improved equipment or new methods of control with minimum cost.

The selector stations utilized in the control systems of FIGS. 13 and 14 are mounted on a control panel 182 along with suitable recording instruments 184, 186 and 188 which may be provided for indicating and recording the values of the various variables measured. The control panel 182 and cabinet 40A are connected by appropriate wiring for transmitting the various signals between locations and to final control elements 140, 142 and 168. In the customary power plant, the control panel 182 would be mounted in the control room while the cabinet 40 would be mounted at some other location where space is not a problem or consideration.

As shown the various power supplies required by the system may also be mounted in shelves of the cabinet 40A for ease of replacement and servicing. Manually operable dials are provided on the face plates of the summing unit for adjusting the input resistors $R_{1a}$, $R_{1b}$, $R_{1c}$ and $R_{1d}$ as previously described. Similarly, the other units illustrated are provided with dials for adjusting the gain, reset and rate time as desired.

It will be apparent to those skilled in the art that many changes may be made in the construction and arrangement of the parts without departing from the scope of the invention as defined in the appended claims.

What we claim as new and desire to secure by Letters Patent of the United States is:

1. In an electric control system, the combination comprising, means responsive to a variable for establishing a first electric signal proportional to the deviation of the variable from a predetermined value, an electric controller responsive to said first signal having a feedback circuit including an impedance producing a controller output signal varying in accordance with the time integral of said first signal, electrically operative control means responsive to said output signal for varying the magnitude of the variable, means for establishing a second electric signal, transfer means having a first position for applying said controller output signal to said control means and a second position for applying said second electric signal to said control means to selectively operate said control means from said controller output signal or said second signal and means for producing an electrical effect in said controller when said transfer means is in said second position to inhibit said controller output signal from varying in accordance with the time integral of said first signal.

2. In an electric control system, the combination comprising, means responsive to a variable for establishing a first electrical signal proportional to the magnitude of the variable, an electric controller having an input and an output, said controller including an amplifier circuit operative to amplify said first electrical signal, a feedback impedance element in said amplifier circuit and having a variable voltage drop for introducing an integral control action into said first signal, electrically operative control means responsive to the output signal of said controller for varying the magnitude of the variable, and electric circuit means limiting the voltage drop across said impedance to thereby limit said integral control action within preselected limits.

3. In an electrc control system as claimed in claim 2 wherein said impedance element comprises, a capacitor connected in an external feedback circuit of said amplifier to provide reset action.

4. In an electric control system as claimed in claim 3 wherein said limiting circuit comprises, a voltage source having positive and negative terminals connected through a pair of diode rectifiers respectively to one side of said capacitor.

5. In an electric control system as claimed in claim 4 wherein said diode rectifiers are arranged to conduct at predetermined positive and negative values of the voltage across said capacitor respectively.

6. In an electric control system, the combination comprising, means responsive to a variable for establishing a first voltage signal proportional to the magnitude of the variable, an electric controller including an amplifier having an external feedback circuit and a capacitor connected in said feedback circuit to produce a controller output voltage signal proportional to the integral of said first signal, the voltage drop across the capacitor being substantially equal to said output signal, electrically operative control means adapted to vary the magnitude of the variable, a pair of manually adjustable power supplies each comprising a voltage source and a potentiometer circuit having a manually adjustable contact arm, a transfer switch having one position for applying the output of said controller to said control means and a second position for applying the potential of one of said contact arms to said control means, an operative connection between said contact arms to effect simultaneous positioning of the same, switch means operatively associated with said transfer switch and operative in said second position of the same to apply the potential of the other of said contact arms across said capacitor, and a voltage limiting circuit effective to limit the voltage drop across the capacitor to thereby limit the output signal of said controller.

7. In an electric control system as claimed in claim 6 wherein said limiting circuit comprises a pair of diode rectfiers connected between the positive and negative terminals respectively of one of said voltage sources and one side of said capacitor.

8. In an electric control system as claimed in claim 7 wherein a third manually adjustable power supply is provided comprising a voltage source and a potentiometer circuit having a manually adjustable contact arm, and circuit means are provided for establishing an input to said controller proportional to the difference between the output of said variable responsive means and the potential of said contact arm of said third power supply.

9. In an electric control system as claimed in claim 8 wherein an indicating electrical meter is provided having input terminals for receiving an electrical signal and having switch means effective in a first position to connect the output of said controller and said one contact arm in opposition across said input terminals, a second position for connecting the first voltage signal across said terminals, and a third position for connecting said input terminals to a variable electric signal representative of the position of said control means.

References Cited

UNITED STATES PATENTS

| 2,844,311 | 7/1958 | Baum | 235—184 |
| 2,849,183 | 8/1958 | Kuck | 235—151 X |
| 3,011,709 | 12/1961 | Jacoby | 235—151.1 |

OTHER REFERENCES

Eelectronic Analog Computers, Korn and Korn, McGraw-Hill, 1956, p. 347.

MALCOLM A. MORRISON, Primary Examiner

ROBERT W. WEIG, Assistant Examiner